United States Patent
Shin et al.

(10) Patent No.: US 9,637,825 B2
(45) Date of Patent: May 2, 2017

(54) HIGH-TEMPERATURE LONG LIFESPAN ELECTRODE FOR ELECTRIC DUAL LAYER CAPACITOR AND METHOD OF MANUFACTURING THE SAME

(71) Applicant: KOREA JCC CO., LTD., Cheongwon-gun (KR)

(72) Inventors: Dal Woo Shin, Cheongju-si (KR); Mun Soo Lee, Cheongju-si (KR); Jin Sik Shin, Cheongju-si (KR)

(73) Assignee: KOREA JCC CO., LTD., Cheongwon-Gun (KR)

( * ) Notice: Subject to any disclaimer, the term of this patent is extended or adjusted under 35 U.S.C. 154(b) by 144 days.

(21) Appl. No.: 14/645,812

(22) Filed: Mar. 12, 2015

(65) Prior Publication Data

US 2015/0332862 A1    Nov. 19, 2015

(30) Foreign Application Priority Data

May 14, 2014  (KR) .................. 10-2014-0057836
Feb. 6, 2015  (KR) .................. 10-2015-0018628

(51) Int. Cl.
| | | |
|---|---|---|
| H01G 11/04 | (2013.01) | |
| C23C 18/16 | (2006.01) | |
| C25D 5/44 | (2006.01) | |
| H01G 11/34 | (2013.01) | |
| H01G 11/86 | (2013.01) | |
| C23C 18/31 | (2006.01) | |
| H01G 11/24 | (2013.01) | |
| H01G 11/66 | (2013.01) | |

(Continued)

(52) U.S. Cl.
CPC .......... *C23C 18/16* (2013.01); *C23C 18/1691* (2013.01); *C23C 18/31* (2013.01); *C25D 5/44* (2013.01); *H01G 11/04* (2013.01); *H01G 11/24* (2013.01); *H01G 11/34* (2013.01); *H01G 11/66* (2013.01); *H01G 11/68* (2013.01); *H01G 11/70* (2013.01); *H01G 11/86* (2013.01); *Y02E 60/13* (2013.01)

(58) Field of Classification Search
CPC ........ H01G 11/42; H01G 11/04; H01G 11/28; H01G 11/30; H01G 11/32
See application file for complete search history.

(56) References Cited

U.S. PATENT DOCUMENTS 8,085,525 B2 * 12/2011  Sakata .................. H01G 9/016
                                                   361/502
8,871,358 B2    10/2014  Jiang et al.
(Continued)

FOREIGN PATENT DOCUMENTS

KR      101166148       7/2012

*Primary Examiner* — Nguyen Ha
(74) *Attorney, Agent, or Firm* — Cantor Colburn LLP (57) ABSTRACT

A high-temperature long lifespan electrode includes a through type aluminum sheet, a plurality of first hollow protrusion members protruded to one side of the through type aluminum sheet, a plurality of second hollow protrusion members protruded to the other side of the through type aluminum sheet, a metal protection layer coated on the through type aluminum sheet, the plurality of first hollow protrusion members, a first active material sheet bonded to one surface of the through type aluminum sheet, and a second active material sheet bonded to the other surface of the second surface of the through type aluminum sheet.

17 Claims, 7 Drawing Sheets

(51) Int. Cl.
*H01G 11/68* (2013.01)
*H01G 11/70* (2013.01)

(56) References Cited

U.S. PATENT DOCUMENTS

| | | | |
|---|---|---|---|
| 2010/0020471 A1* | 1/2010 | Schneuwly | H01G 9/016 |
| | | | 361/502 |
| 2013/0207266 A1* | 8/2013 | Hua | H01L 23/53238 |
| | | | 257/745 |
| 2015/0332865 A1* | 11/2015 | Shin | H01G 11/24 |
| | | | 361/502 |

* cited by examiner

| Carbide: Mixed alkali | NaOH:KOH | Specific surface area (m²/g) | Impurities (ppm) |
|---|---|---|---|
| 1:2.0 | 1:9 | 1640 | 320.5 |
| 1:2.3 | | 1720 | 331.1 |
| 1:2.6 | | 1900 | 340.8 |
| 1:3.0 | | 2050 | 427.4 |

HIGH-TEMPERATURE LONG LIFESPAN ELECTRODE FOR ELECTRIC DUAL LAYER CAPACITOR AND METHOD OF MANUFACTURING THE SAME

CROSS-REFERENCE TO RELATED APPLICATION

This application claims the benefit of Korean Patent Application No. 10-2014-0057836, filed on May 14, 2014 and Korean Patent Application No. 10-2015-0018628, filed on Feb. 6, 2015 in the Korean Intellectual Property Office, the disclosure of which is incorporated herein by reference.

BACKGROUND OF THE INVENTION

1. Field of the Invention

The present invention relates to a high-temperature long lifespan electrode for an electric double layer capacitor and a method of manufacturing the same and, more particularly, to a high-temperature long lifespan electrode for an electric double layer capacitor and a method of manufacturing the same, which are capable of implementing a high-temperature long lifespan electrode by preventing a loss of the surface area of an aluminum sheet that is used in an electrode for an electric double layer capacitor so that a contact area between the aluminum sheet and an active material sheet is increased when forming a plurality of through holes in the aluminum sheet and by forming a metal protection layer on the entire surface of the aluminum sheet.

2. Description of the Related Art

An electric double layer capacitor (EDLC) has a less influence on the lifespan although it is repeatedly charged and discharged because it stores electric energy using a physical adsorption phenomenon with reversibility and is being applied to smart phones, hybrid vehicles, electric vehicles, and the energy storage device field applied to solar cell generation. The electric double layer capacitor has an excellent power density, but has a low energy density. Accordingly, there is a need to develop materials for electrodes in order to improve the low energy density problem.

Korean Patent No. 1166148 (Patent Document 1) relates to a method of manufacturing an aluminum current collector having a three-dimensional pattern structure using photolithography. In the method of manufacturing the aluminum current collector disclosed in Patent Document 1, first, after an aluminum foil current collector is cleaned, it is dried using nitrogen atmosphere. Thereafter, a photoresist solution is coated on a surface of the dried aluminum foil current collector and then dried and cured so that the photoresist solution is selectively exposed.

Thereafter, the photoresist solution that has not been exposed is selectively removed by scattering a developer on the aluminum current collector that has been exposed so that the remaining photoresist solution is fully cured, thereby forming a pattern on the aluminum current collector. The aluminum foil current collector in which the pattern has been formed is placed between two carbon plates, that is, opposite electrodes, AC power is applied to the aluminum foil current collector, and primary etching is performed on the aluminum current collector in an electrolyte.

Thereafter, the etched aluminum current collector is dried. Next, the aluminum current collector dried after the primary etching is placed between the two carbon plates, that is, opposite electrodes, and secondary etching is performed on the aluminum current collector. Thereafter, the aluminum foil subjected to the secondary etching is cleaned and dried.

As in Patent Document 1, the energy density of a conventional electrode for an electric double layer capacitor is improved by forming a pattern, that is, a plurality of through holes, in an aluminum current collector using a photolithography process so that a contact area between the aluminum current collector and active materials is increased.

If a plurality of through holes is formed in an aluminum current collector that is used in a conventional electrode for an electric double layer capacitor as in Patent Document 1, however, there is a problem in that the surface area of the aluminum current collector is lost by an area that belongs to a total area of the aluminum current collector and that is occupied by the through holes.

SUMMARY OF THE INVENTION

Accordingly, the present invention has been made keeping in mind the above problems occurring in the prior art, and an object of the present invention is to provide a high-temperature long lifespan electrode for an electric double layer capacitor and a method of manufacturing the same, which are capable of implementing a high-temperature long lifespan electrode by preventing a loss of the surface area of an aluminum sheet that is used in an electrode for an electric double layer capacitor so that a contact area between the aluminum sheet and an active material sheet is increased when forming a plurality of through holes in the aluminum sheet and by forming a metal protection layer on the entire surface of the aluminum sheet.

In an embodiment, a high-temperature long lifespan electrode for an electric double layer capacitor may include a through type aluminum sheet configured to have a plurality of through holes formed in the through type aluminum sheet so that the through holes are spaced apart from one another; a plurality of first hollow protrusion members extended from the through type aluminum sheet in such a way as to communicate with the through holes and protruded to one side of the through type aluminum sheet; a plurality of second hollow protrusion members spaced apart from the plurality of first hollow protrusion members, extended from the through type aluminum sheet in such a way as to communicate with the through holes, and protruded to the other side of the through type aluminum sheet; a metal protection layer coated on the through type aluminum sheet, the plurality of first hollow protrusion members, and the plurality of second hollow protrusion members; a first active material sheet placed on a first surface of the through type aluminum sheet and bonded to the metal protection layer so that the plurality of first hollow protrusion members is buried; and a second active material sheet placed on a second surface of the through type aluminum sheet and bonded to the metal protection layer so that so that the plurality of second hollow protrusion members is buried and the second active material sheet is connected to the first active material sheet through the plurality of first hollow protrusion members and the plurality of second hollow protrusion members.

In an embodiment, a method of manufacturing a high-temperature long lifespan electrode for an electric double layer capacitor may include preparing a through type aluminum sheet configured to have a plurality of first hollow protrusion members and a plurality of second hollow protrusion members respectively formed in a first surface and second surface of the through type aluminum sheet and to have a metal protection layer formed on an entire surface by winding the through type aluminum sheet on a first roller; preparing a first active material sheet by winding the first active material sheet on a second roller; preparing a second active material sheet by winding the second active material sheet on a third roller; placing the first active material sheet on the first surface of the through type aluminum sheet and the second active material sheet on the second surface of the through type aluminum sheet and transferring the through type aluminum sheet and the first active material sheet and the second active material sheet to a press unit; and placing the first active material sheet and the second active material sheet on the first surface and second surface of the through type aluminum sheet, respectively, bonding the first active material sheet and the second active material sheet to the metal protection layer, and simultaneously pressurizing the first active material sheet and the second active material sheet using the press unit so that the first active material sheet and the second active material sheet are connected through the plurality of first hollow protrusion members and the plurality of second hollow protrusion members.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a high-temperature long lifespan electrode for an electric double layer capacitor and a method of manufacturing the same according to some embodiments of the present invention are described.

Figure 1:
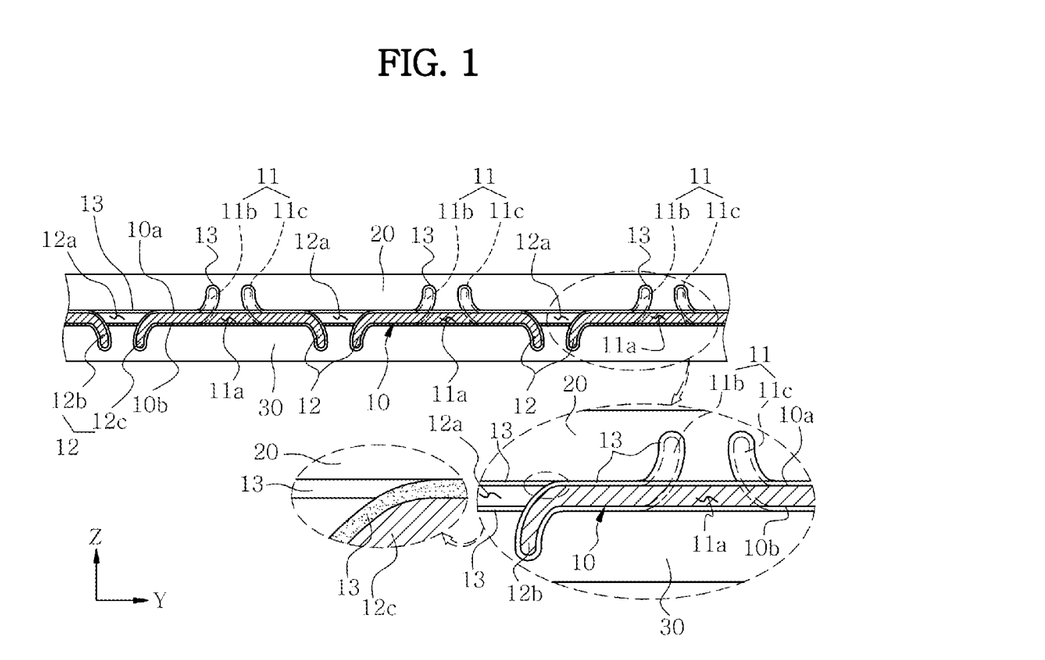
FIG. 1 is a cross-sectional view of a high-temperature long lifespan electrode which may be applied to an electric double layer capacitor according to an embodiment of the present invention.
Figure 2:
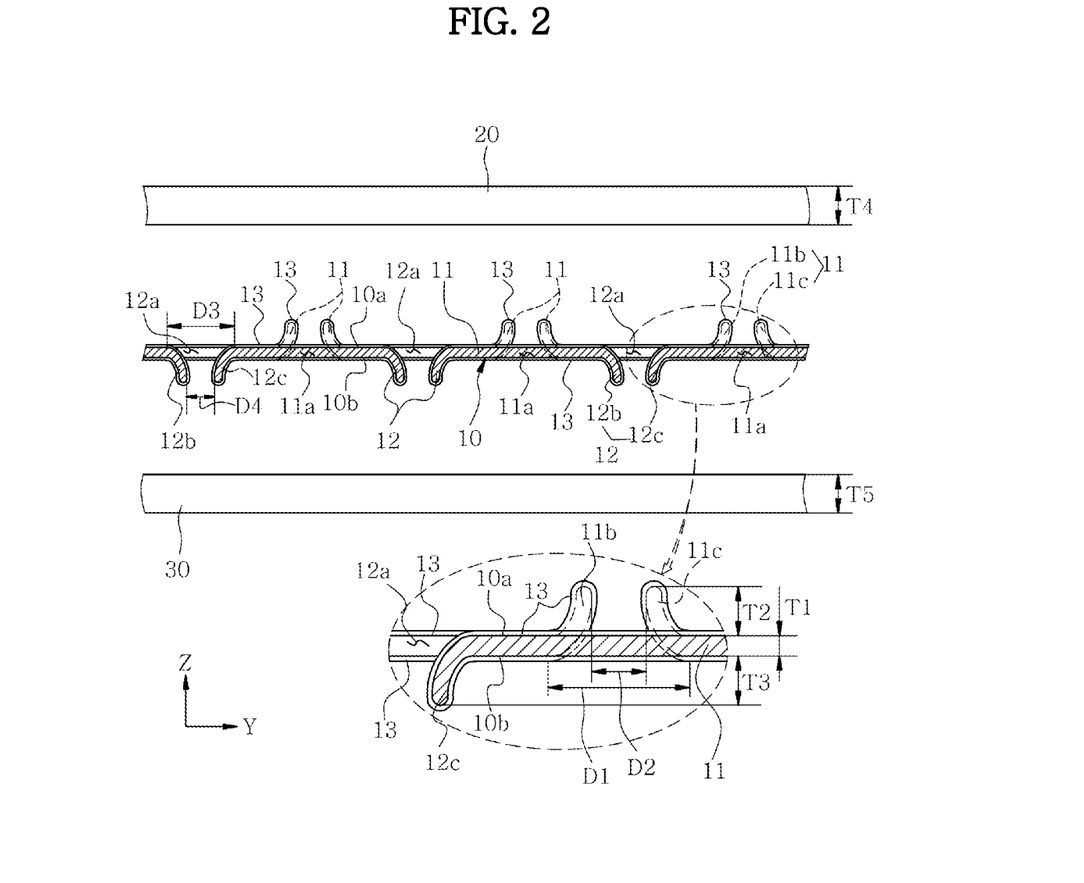
FIG. 2 is a cross-sectional view illustrating a state before an active material sheet is bonded to a through type aluminum sheet of FIG. 1.

As illustrated in FIGS. 1 and 2, the high-temperature long lifespan electrode for an electric double layer capacitor in accordance with an embodiment of the present invention may include a through type aluminum sheet 10, a first active material sheet 20, and a second active material sheet 30.

The through type aluminum sheet 10 has a plurality of through holes 11a and 12a spaced apart from one another and formed therein and includes a plurality of first hollow protrusion members 11, a plurality of second hollow protrusion members 12, and a metal protection layer 13. The plurality of first hollow protrusion members 11 is extended from the through type aluminum sheet 10 in such a way as to respectively communicate with the plurality of through holes 11a and is protruded to one side of the through type aluminum sheet 10. The plurality of second hollow protrusion members 12 is spaced apart from the plurality of first hollow protrusion members 11. Furthermore, the plurality of second hollow protrusion members 12 is extended from the through type aluminum sheet 10 in such a way as to respectively communicate with the through holes 12a and is protruded to the other side of the through type aluminum sheet 10. The metal protection layer 13 is coated on the through type aluminum sheet 10, the plurality of first hollow protrusion members 11, and the plurality of second hollow protrusion members 12. The first active material sheet 20 is bonded to the first surface 10a of the through type aluminum sheet 10 so that the plurality of first hollow protrusion members 11 is buried. The second active material sheet 30 is bonded to the second surface 10b of the through type aluminum sheet 10 so that the plurality of second hollow protrusion members 12 is buried and the second active material sheet 30 is connected to the first active material sheet 20 through the plurality of first hollow protrusion members 11 and the plurality of second hollow protrusion members 12.

The configuration of the high-temperature long lifespan electrode for an electric double layer capacitor in accordance with an embodiment of the present invention is described in more detail below.

Figure 3:
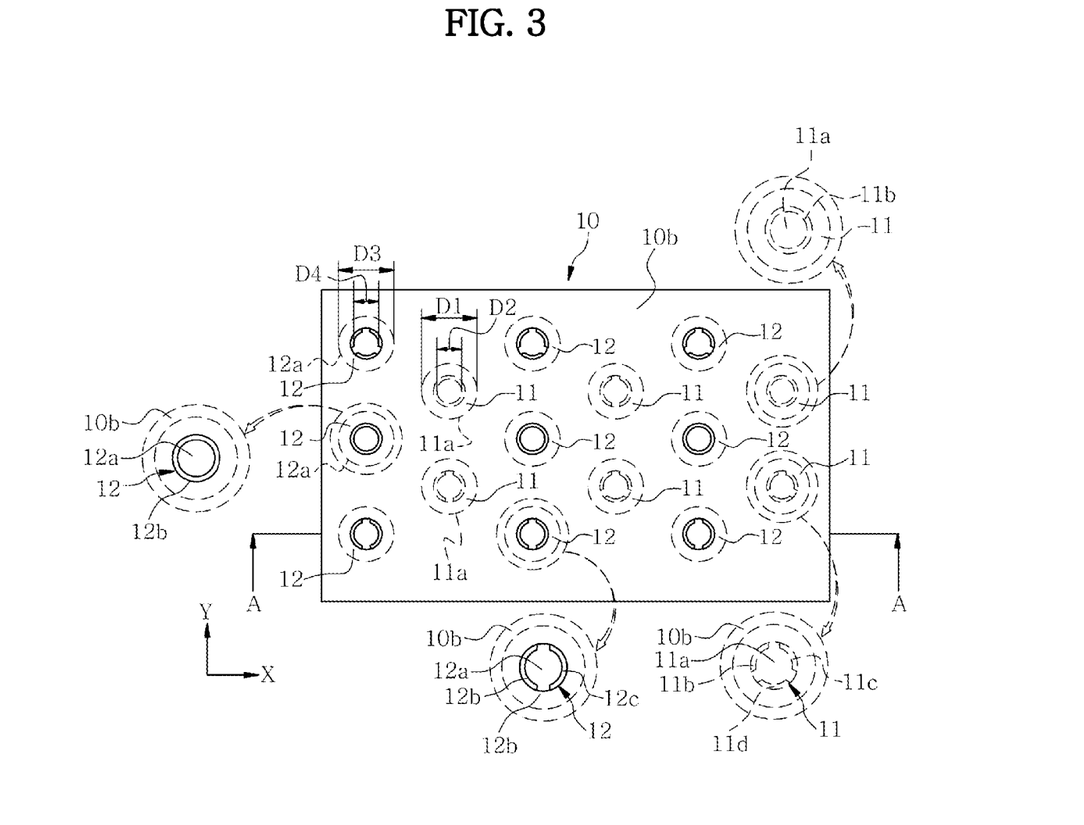
FIG. 3 is a rear view of the through type aluminum sheet of FIG. 2 which is seen from the other side.

As illustrated in FIGS. 1 to 3, the through type aluminum sheet 10 includes the plurality of through holes 11a and 12a spaced apart from one another. The first surface 10a and second surface 10b of the through type aluminum sheet 10 are formed to be penetrated. Each of the diameters D1 and D3 of the respective holes 11a and 12a may be 50 to 100 μm. The through type aluminum sheet 10 in which the plurality of through holes 11a and 12a is formed may have a thickness T1 of 10 to 50 μm. The through type aluminum sheet 10 improves a specific resistance characteristic using purity of 99.20 to 99.99%, thereby improving the electrical properties of the high-temperature long lifespan electrode applied to an electric double layer capacitor according to an embodiment of the present invention. In this case, FIG. 1 is an enlarged sectional view of a portion "Aa" illustrated in FIG. 8 and the through type aluminum sheet 10 of FIG. 2 is a cross-sectional view of line "A-A" illustrated in FIG. 3.

Figure 4:
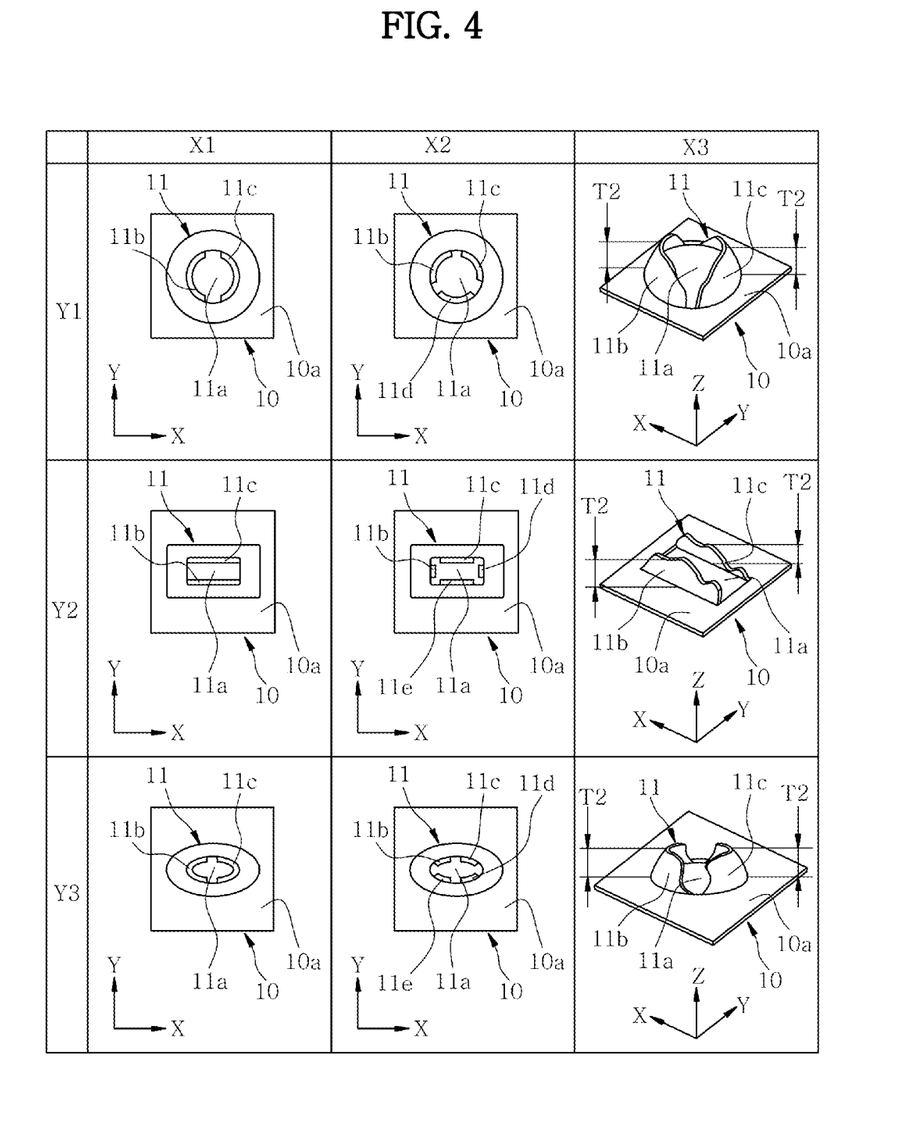
FIG. 4 is a table illustrating various embodiments of first hollow protrusion members illustrated in FIG. 2.

As illustrated in FIGS. 2 and 3, the plurality of through holes 11a and 12a is formed in the through type aluminum sheet 10 by perforating the through type aluminum sheet 10 using one of a cylindrical pillar member (not illustrated), an elliptical pillar member (not illustrated), and a square pillar member (not illustrated) each having a pointed tip, such as a needle or a drill, by applying pressure on the part of the first surface 10a or the second surface 10b. The plurality of first hollow protrusion members 11 and the plurality of second hollow protrusion members 12 are extended from the through type aluminum sheet 10 and protruded so that they respectively communicate with the plurality of through holes 11a and 12a. As illustrated in FIG. 4, each of the plurality of through holes 11a and 12a may have one of a cylindrical shape, an oval, and a square shape and may be formed as one of the cylindrical pillar member, the elliptical pillar member, and the square pillar member. FIG. 4 is a table illustrating various embodiments of the first hollow protrusion member 11. The second hollow protrusion member 12 is applied like the first hollow protrusion members 11 of FIG. 4, and thus a description and drawings of various embodiments of the second hollow protrusion members 12 are omitted.

For example, the plurality of first hollow protrusion members 11 may include the plurality of through holes 11a formed in the through type aluminum sheet 10 by perforating one of the cylindrical pillar member, the elliptical pillar member, and the square pillar member having a point end in the direction toward the first surface 10a of the through type aluminum sheet 10 by applying pressure. The plurality of first hollow protrusion members 11 is extended from the through holes 11a by the softness of the through type aluminum sheet 10 and protruded to one side of the through type aluminum sheet 10. In this case, the through hole 11a may have one of a cylindrical shape, an oval, and a square shape because it is formed of one of the cylindrical pillar member, the elliptical pillar member, and the square pillar member, as illustrated in FIG. 4.

Each of the plurality of through holes 11a may have one of a cylindrical shape, an oval, and a square shape because it is formed of the cylindrical pillar member, the elliptical pillar member, and the square pillar member, as illustrated in FIG. 4. For example, if the cylindrical pillar member is used, each of the plurality of through holes 11a may have a cylindrical shape as in a column Y1. If the elliptical pillar member is used, each of the plurality of through holes 11a may have an oval as in a column Y3. If the square pillar member is used, each of the plurality of through holes 11a may have a square shape as in a column Y2. The first hollow protrusion members 11 illustrated in a row X3 are perspective views of the first hollow protrusion members 11 illustrated in a row X2.

The plurality of through holes 12a of the plurality of second hollow protrusion members 12 is formed in the through type aluminum sheet 10 by perforating the through type aluminum sheet 10 in the direction toward the second surface 10b of the through type aluminum sheet 10 by applying pressure using one of the cylindrical pillar member, the elliptical pillar member, and the square pillar member each having a pointed tip. The plurality of second hollow protrusion members 12 is extended from the through holes 11a by the softness of the through type aluminum sheet 10 and protruded to the other side of the through type aluminum sheet 10. In this case, like the plurality of through holes 11a of FIG. 4, each of the plurality of through holes 12a has one of a cylindrical shape, an oval, and a square shape because it is formed of one of the cylindrical pillar member, the elliptical pillar member, and the square pillar member, as illustrated in FIG. 4.

The plurality of first hollow protrusion members 11 and the plurality of second hollow protrusion members 12 include one or more extruded burr members 11b, 11c, and 11d and 12b, 12c, and 12d because they are made of one of the cylindrical pillar member, the elliptical pillar member, and the square pillar member each having a pointed tip. For example, as illustrated in FIG. 3, the first hollow protrusion member 11 and the second hollow protrusion member 12 may include respective extruded burr members 11b and 12b or may have two or more extruded burr members 11b, 11c, and 11d and 12b, 12c, and 12d. That is, a single through type aluminum sheet 10 may include the first hollow protrusion member 11 and the second hollow protrusion member 12 that include respective extruded burr members 11b and 12b or include the two or more extruded burr members 11b, 11c, and 11d and 12b, 12c, and 12d, respectively. As in the first hollow protrusion members 11 of FIG. 4, the first hollow protrusion member 11 may include four extruded burr members 11b, 11c, 11d, and 11e if the through hole 11a is formed to have a square shape or an oval as in the column Y3 or the column Y3. The same principle applied to the first hollow protrusion members 11 may be applied to the second hollow protrusion members 12. In the table of FIG. 4, the row X1 illustrates an embodiment in which two extruded burr members 11b and 11c have been formed in the first hollow protrusion member 11. The row X2 illustrates an embodiment in which three or four extruded burr members 11b, 11c, 11d, and 11e have been formed in the first hollow protrusion member 11. The row X3 is a perspective view of the first hollow protrusion member 11 illustrated in the row X1. Furthermore, FIG. 1 is a cross-sectional view of a high-temperature long lifespan electrode for an electric double layer capacitor formed the first hollow protrusion members 11 and the second hollow protrusion members 12 in which the two extruded burr members 11b, 11c, and 12b, 12c illustrated in the row X1 and column Y1 of FIG. 4 have been formed.

The one or more extruded burr members 11b, 11c, and 11d and 12b, 12c, and 12d are extended from the through holes 11a and 12a and are integrally formed in the through type aluminum sheet 10 so that they are spaced apart from one another. The one or more extruded burr members 11b, 11c, and 11d and 12b, 12c, and 12d have respective heights T2 and T3 of 2 to 70 μm. For example, as illustrated in FIGS. 2 and 4, the heights T2 and T3 of the extruded burr members 11b and 12b are the highest heights from the first surface 10a of the through type aluminum sheet 10 or the second surface 10b. The plurality of extruded burr members 11b, 11c, and 11d and 12b, 12c, and 12d has been illustrated as having a height of 2 μm or more from the first surface 10a of the through type aluminum sheet 10 or the second surface 10b in the state in which they have been separated. Since the plurality of first hollow protrusion members 11 and the plurality of second hollow protrusion members 12 are formed to have the one or more extruded burr members 11b, 11c, and 11d and 12b, 12c, and 12d as described above, the surface area of the through type aluminum sheet 10 can be further increased. For example, if the first hollow protrusion member 11 and the second hollow protrusion member 12 are formed of cylindrical pillar members, the cylindrical through holes 11a and 12a having uniform diameters D1 and D3 may be formed in the first hollow protrusion member 11 and the second hollow protrusion member 12, or the extruded burr members 11b and 12b may be formed so that one side or the other side of the first hollow protrusion member 11 and the second hollow protrusion member 12 has an inside diameter D2, D4 equal to or smaller than the diameter D1, D3, thereby further increasing the surface area of the through type aluminum sheet 10.

The metal protection layer 13 is coated on surfaces of the through type aluminum sheet 10, the plurality of first hollow protrusion members 11, and the plurality of second hollow protrusion members 12 so that it surrounds the through type aluminum sheet 10. That is, the metal protection layer 13 may be formed to include a surface of the through type aluminum sheet 10, the outer circumference surfaces and inner circumference surfaces of the plurality of first hollow protrusion members 11, and the outer circumference surface and inner circumference surfaces of the plurality of second hollow protrusion members 12, thereby preventing the through type aluminum sheet 10 from being damaged by moisture remaining in the through type aluminum sheet 10. Since the metal protection layer 13 protects the through type aluminum sheet 10 as described above, an electric double layer capacitor to which the high-temperature long lifespan electrode according to an embodiment of the present invention may be applied can operate in a wide temperature range and the high-temperature long lifespan electrode having an improved long lifespan cycle characteristic and high reliability can be fabricated. In this case, the metal protection layer 13 may be made of one of nickel (Ni), zinc (Zn), and tin (Sn). The materials of the metal protection layer 13 is formed on the entire surface of the through type aluminum sheet 10, including the plurality of first hollow protrusion members 11 and the plurality of second hollow protrusion members 12, using either an electrolytic method or an electroless plating method.

The first active material sheet 20 and the second active material sheet 30 are simultaneously pressurized to the first surface 10a and second surface 10b of the through type aluminum sheet 10 and bonded to the metal protection layer 13 by repeating a roll press method twice or more so that they are connected through the plurality of first hollow protrusion members 11 and the plurality of second hollow protrusion members 12, as illustrated in FIGS. 1 and 2. If the roll press method is repeatedly performed twice or more, the thicknesses T4 and T5 of the first active material sheet 20 and the second active material sheet 30 pressurized by the roll press method that is finally performed are 2 to 30% smaller than the thicknesses T6 and T7 (refer to FIG. 8) of the first active material sheet 20 and the second active material sheet 30 pressurized by the roll press method that is first performed.

As described above, the first active material sheet 20 and the second active material sheet 30 are simultaneously pressurized and bonded to the through type aluminum sheet 10 by repeating the roll press method twice or more. Accordingly, external appearances of the plurality of first hollow protrusion members 11 and the plurality of second hollow protrusion members 12 can be prevented from being changed or damage to the through holes 11a and 12a, such as that the through holes 11a and 12a are clogged, can be prevented due to applied pressure for bonding the first active material sheet 20 and the second active material sheet 30 together, and an equivalent series resistance characteristic can be prevented from being deteriorated, thereby being capable of implementing an electrode with a high-temperature long lifespan.

Figure 8:
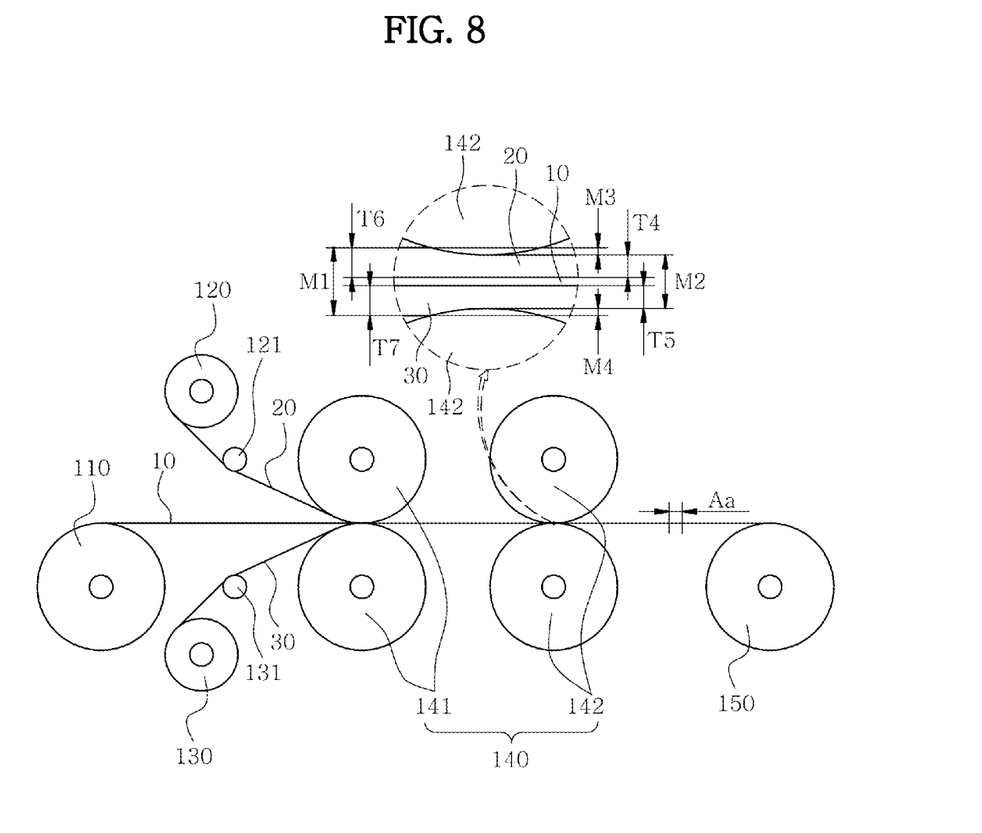
FIG. 8 is a diagram schematically illustrating the configuration of an apparatus for manufacturing the high-temperature long lifespan electrode, which may be applied to an electric double layer capacitor in accordance with an embodiment of the present invention.

For example, the high-temperature long lifespan electrode for an electric double layer capacitor in accordance with an embodiment of the present invention may be formed by repeating a roll press method twice or more using a press unit 140 illustrated in FIG. 8.

In the roll press method that is first performed, the first active material sheet 20 and the second active material sheet 30 are bonded to the metal protection layer 13 so that they are respectively placed on the first surface 10a and second surface 10b of the through type aluminum sheet 10 by applying pressure lower than that used in the roll press method that is finally performed. That is, since the first active material sheet 20 and the second active material sheet 30 are bonded to the through type aluminum sheet 10 with low pressure, a change in external appearances of the plurality of first hollow protrusion members 11 and the plurality of second hollow protrusion members 12 attributable to the pressure can be prevented. As described above, in the roll press method that is first performed, the first active material sheet 20 and the second active material sheet 30 are partially filled in the first hollow protrusion members 11 or the second hollow protrusion members 12. As a result, a change in external appearances of the first hollow protrusion members 11 or the second hollow protrusion members 12, which may occur because pressure higher than the pressure used in the roll press method that is first performed is applied to the first hollow protrusion members 11 or the second hollow protrusion members 12, can be prevented.

If the roll press method that is second performed is a roll press method that is finally performed, in the roll press method that is finally performed, the first active material sheet 20 and the second active material sheet 30 are bonded to the metal protection layer 13 so that they are respectively placed on the first surface 10a and second surface 10b of the through type aluminum sheet 10 by applying pressure higher than that used in the roll press method that is first performed. In the roll press method that is finally performed, although pressure higher than that used in the roll press method that is first performed is applied, external appearances of the first hollow protrusion members 11 or the second hollow protrusion members 12 can be prevented from being changed because the first active material sheet 20 and the second active material sheet 30 have been partially filled in the first hollow protrusion members 11 or the second hollow protrusion members 12 to some extent. In the roll press method that is finally performed, the first active material sheet 20 and the second active material sheet 30 are simultaneously pressurized by applying pressure higher than that used in the roll press method that is first performed. Accordingly, the first active material sheet 20 and the second active material sheet 30 are filled in the plurality of through holes 11a and 12a in the state in which they have been filled in the plurality of first hollow protrusion members 11 and the plurality of second hollow protrusion members 12 and are thus connected.

By the roll press method that is finally performed, the first active material sheet 20 and the second active material sheet 30 are filled in the plurality of through holes 11a and 12a in the state in which they have been filled in the plurality of first hollow protrusion members 11 and the plurality of second hollow protrusion members 12 and bonded to the inner circumference surfaces or outer circumference surfaces of the plurality of first hollow protrusion members 11 and the plurality of second hollow protrusion members 12. Accordingly, the deterioration of an equivalent series resistance characteristic can be prevented because a contact area between the through type aluminum sheet 10 and the first active material sheet 20 and the second active material sheet 30 is increased. The first active material sheet 20 and the second active material sheet 30 are made of the same active materials and are formed by pressurization so that they have the thicknesses T4 and T5 which are 2 to 30% smaller than the thicknesses T6 and T7, thereby being capable of increasing a contact area. Accordingly, a high-temperature long lifespan having an improved equivalent series resistance characteristic can be fabricated. Each of the thicknesses T4 and T5 may be 100 to 500 μm. In this case, activated carbon may be used as the active materials, and activated carbon may have an average particle diameter of about 1 to 10 μn and a specific surface area of 1200 to 2200 $m^2/g$.

A method of manufacturing the high-temperature long lifespan electrode for an electric double layer capacitor in accordance with an embodiment of the present invention is described below with reference to the accompanying drawings.

Figure 5:
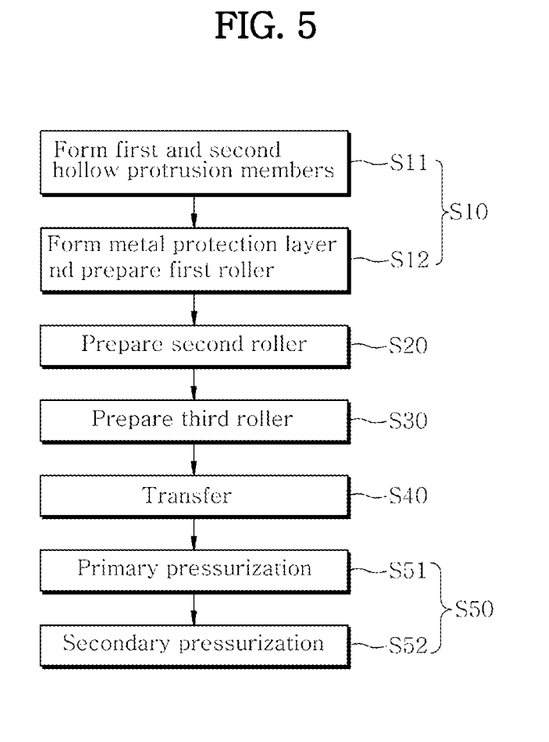
FIG. 5 is a process flowchart illustrating a method of manufacturing the high-temperature long lifespan electrode, which may be applied to an electric double layer capacitor in accordance with an embodiment of the present invention.

In the method of manufacturing the high-temperature long lifespan electrode for an electric double layer capacitor in accordance with an embodiment of the present invention, as illustrated in FIGS. 5 and 8, first, after the plurality of first hollow protrusion members 11 and the plurality of second hollow protrusion members 12 are respectively formed on the first surface 10a and the second surface 10b, the metal protection layer 13 is formed to cover the plurality of first hollow protrusion members 11 and the plurality of second hollow protrusion members 12. After the metal protection layer 13 is formed, the through type aluminum sheet 10 is prepared by winding it on a first roller 110 at step S10. Furthermore, the first active material sheet 20 is prepared by winding the first active material sheet 20 on a second roller 120 at step S20, and the second active material sheet 30 is prepared by winding the second active material sheet 30 on a third roller 130 at step S30. When the first roller 110, the second roller 120, and the third roller 130 are prepared, the first active material sheet 20 is placed on the first surface 10a of the through type aluminum sheet 10, the second active material sheet 30 is placed on the second surface 10b of the through type aluminum sheet 10, and the through type aluminum sheet 10, the first active material sheet 20, and the second active material sheet 30 are transferred to the press unit 140 at step S40. When the through type aluminum sheet 10, the first active material sheet 20, and the second active material sheet 30 are transferred to the press unit 140, the first active material sheet 20 and the second active material sheet 30 are respectively placed on the first surface 10a and second surface 10b of the through type aluminum sheet 10 and then bonded to the metal protection layer 13. Thereafter, the first active material sheet 20 and the second active material sheet 30 are simultaneously pressurized by the press unit 140 so that they are connected through the plurality of first hollow protrusion members 11 and the plurality of second hollow protrusion members 12 at step S50. Thereafter, the high-temperature long lifespan electrode for an electric double layer capacitor in accordance with an embodiment of the present invention is manufactured using a known dry process.

At step S10 of preparing the through type aluminum sheet 10 by winding it on the first roller 110, first, the plurality of first hollow protrusion members 11 and the plurality of second hollow protrusion members 12 are respectively formed in the first surface 10a and second surface 10b of the through type aluminum sheet 10 at step S11. More specifically, the plurality of through holes 11a and 12a is formed in the through type aluminum sheet 10 by perforating the through type aluminum sheet 10 using one of the cylindrical pillar member (not illustrated), the elliptical pillar member (not illustrated), and the square pillar member (not illustrated) each having a pointed tip by applying pressure to the first surface 10a or the second surface 10b of the through type aluminum sheet 10. Furthermore, the plurality of first hollow protrusion members 11 or the plurality of second hollow protrusion members 12 is integrally formed in the through type aluminum sheet 10 so that they are extended from the through type aluminum sheet 10 and protruded in such a way as to respectively communicate with the plurality of through holes 11a and 12a.

The plurality of first hollow protrusion members 11 and the plurality of second hollow protrusion members 12 formed in the through type aluminum sheet 10 are protruded to one side or the other side of the through type aluminum sheet 10, that is, in a first direction or a second direction. The first direction is a direction toward the first surface 10a of the through type aluminum sheet 10. The second direction is opposite the first direction and is a direction toward the second surface 10b of the through type aluminum sheet 10.

After the plurality of first hollow protrusion members 11 and the plurality of second hollow protrusion members 12 are formed, the metal protection layer 13 is formed by performing electrolytic plating or electroless plating on the through type aluminum sheet 10 in which the plurality of first hollow protrusion members 11 and the plurality of second hollow protrusion members 12 have been formed. Thereafter, the through type aluminum sheet 10 is prepared by winding it on the first roller 110 at step S12. That is, materials for the metal protection layer 13 are coated on the entire surface of the through type aluminum sheet 10, including the plurality of first hollow protrusion members 11 and the plurality of second hollow protrusion members 12, using an electrolytic method or an electroless plating method. One of nickel (Ni), zinc (Zn), and tin (Sn) different from materials for the through type aluminum sheet 10 may be used as the materials for the metal protection layer 13. Electrolytic plating may be performed if the metal protection layer 13 is made of nickel (Ni), zinc (Zn), or tin (Sn). That is, the metal protection layer 13 may be made of one of nickel (Ni), zinc (Zn), and tin (Sn) using electrolytic plating or electroless plating. Furthermore, the metal protection layer 13 may be made of NiWPd of a ternary alloy using electroless plating. In this case, NiWPd of the ternary alloy includes nickel (Ni), tungsten (W), and palladium (Pd), and the metal protection layer 13 may have a thickness T8 (refer to FIG. 1) of 0.1 to 3 μm.

Figure 7:
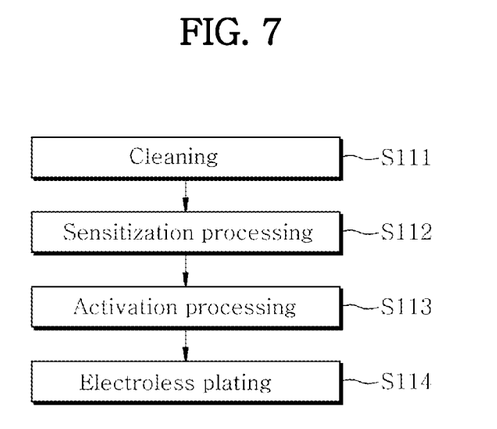
FIG. 7 is a flowchart illustrating an embodiment of the fabrication of a metal protection layer illustrated in FIG. 5.

In the electroless plating for fabricating the metal protection layer 13 using NiWPd of the ternary alloy, as illustrated in FIG. 7, first, the through type aluminum sheet 10 in which the first active material sheet 20 and the second active material sheet 30 have been formed is cleaned using deionized water at step S111. After the through type aluminum sheet 10 is cleaned, the cleaned through type aluminum sheet 10 is immersed in a mixed solution including $SnCl_2$ of 1 to 5 g/L and HCl of 1 to 5 ml at normal temperature for 1 to 5 minutes and then subjected to sensitization processing at step S112. Thereafter, the through type aluminum sheet 10 that has been subjected to the sensitization processing is immersed in a mixed solution of $PdCl_2$ of 1 to 10 g/L and HCl of 1 to 10 ml at normal temperature for 1 to 10 minutes and then subjected to activation processing at step S113. Thereafter, the through type aluminum sheet 10 that has been subjected to the activation processing is subjected to electroless plating processing in a plating solution having PH of 7 to 9 and a temperature of 50 to 70° C. for 10 to 30 minutes, thereby forming the metal protection layer 13 made of NiWPd of the ternary alloy at step S114.

The plating solution used in the electroless plating processing may include $NiSO_4.7H_2O$ of 1 to 7 g/L, $Na_2WO_4.2H_2O$ of 28 to 35 g/L, a complex agent (e.g., ammonium citrate: $C_6H_{17}N_3O_7$) of 29 to 36 g/L, and a reducing agent (e.g., sodium hypophosphite: $NaH_2PO_2$) of 18 to 25 g/L. The complex agent may include $C_6H_{17}N_3O_7$, and the reducing agent may include $NaH_2PO_2$. In this case, NiWPd of the ternary alloy is plated on surfaces of the first active material sheet 20 and the second active material sheet 30, and the sensitization or activation processing is also performed on the surfaces of the first active material sheet 20 and the second active material sheet 30.

The metal protection layer 13 functions to protect the through type aluminum sheet 10 from corrosion that may occur due to moisture between the through type aluminum sheet 10 and the first active material sheet 20 or the second active material sheet 30, thereby being capable of improving the high-temperature and long lifespan characteristic of an electric double layer capacitor to which the high-temperature and long lifespan according to an embodiment of the present invention may be applied.

At step S20 of preparing the first active material sheet 20 by winding it on the second roller 120 and step S30 of preparing the second active material sheet 30 by winding it on the third roller 130, the first active material sheet 20 and the second active material sheet 30 are made of the same active materials. The active materials may include an electrode substance of 60 to 80 wt % and a viscosity control substance of 20 to 40 wt % and may have viscosity of 5000 to 10000 cps (centi Poise). The first active material sheet 20 and the second active material sheet 30 having some degree of viscosity as described above are transferred and bonded to the through type aluminum sheet 10, thereby being capable of improving adhesive strength between the first active material sheet 20 and the second active material sheet 30. In this case, the electrode substance may include activated carbon of 85 to 95 wt %, a conductive agent of 3 to 8 wt %, and a binder of 2 to 7 wt %. The viscosity control substance may include alcohol of 30 to 60 wt % and pure water of 40 to 70 wt %. Activated carbon is manufactured by performing activation processing on carbon particle powder fabricated using a known aqueous solution method. The activation processing is performed by mixing the carbon particle powder and mixed alkali in a wt % ratio of 1:2 to 3, drying the mixture, and performing annealing on the mixture in a tube furnace under a nitrogen atmosphere in a temperature of 600 to 1000° C. The mixed alkali is mixed so that a wt % ratio of NaOH and KOH is 1:9 to 12.

A method of manufacturing activated carbon is described in detail below. First, carbon particle powder is fabricated using a known aqueous solution method. Known raw materials may be used as the carbon particle powder. Pitch coke, coconut peels, or a bio substance may be used as the raw materials. Potato starch or pine nuts or corn may be used as the bio substance. After the carbon particle powder is fabricated, activation processing is performed on the carbon particle powder. In the activation processing, first, the carbon particle powder is immersed in a mixed alkali solution for 30 minutes to 2 hours, and the carbon particle powder and mixed alkali are mixed by agitating them for 10 to 15 hours.

After the carbon particle powder is mixed with mixed alkali, the mixture is filtered using a known filter and dried in vacuum in a temperature of 100 to 130° C. for 10 to 15 hours. Thereafter, the mixture is activated by performing annealing in a tube furnace under a nitrogen atmosphere in a temperature of 600 to 1000° C. for 30 minutes to 1½ hours. When the activation is completed, the carbon particle powder mixed with mixed alkali is repeatedly cleaned using distilled water once to 10 times and dried, thereby fabricating activated carbon.

When fabricating activated carbon, mixed alkali including NaOH and KOH forms pores having two types of sizes according to NaOH and KOH in activated carbon. That is, K ions and Na ions form pores of different sizes in activated carbon because they have different sizes and different activation operations. For example, K ions may form pores that are narrower and deeper than pores formed by the activation of Na. Na ions may form pores that are wider and smaller than pores formed by the activation of K ions.

Figure 6:
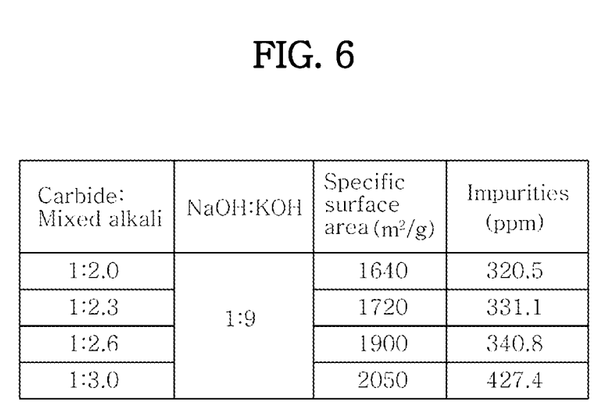
FIG. 6 is a table illustrating the characteristics of activated carbon that is used to manufacture a high density electrode, which may be applied to an electric double layer capacitor according to an embodiment of the present invention.

As illustrated in FIG. 6, the specific surface area of activated carbon was increased in experiments in which a wt % ratio of carbide and mixed alkali was changed to 1:2, 1:2.3, 1:2.6, and 1:3 in the state in which a wt % ratio of NaOH and KOH was fixed to 1:9. If a wt % ratio of KOH is increased in mixed alkali as in those experimental embodiments, the specific surface area of activated carbon is increased from 1200 $m^2$/g to 2200 $m^2$/g as illustrated in FIG. 6, thereby enabling activated carbon having an average particle diameter of 1 to 10 an to be used. That is, the capacity of activated carbon per volume is increased because the specific surface area of activated carbon is increased although activated carbon has a small average particle diameter. Accordingly, the first active material sheet 20 and the second active material sheet 30 having a low equivalent series resistance characteristic can be fabricated because a contact area between activated carbon and the metal protection layer 13 is increased.

Metal impurities that remain in activated carbon was reduced by changing a wt % ratio of carbide and mixed alkali into 1:3, 1:2.6, 1:2.3, or 1:2 in the state in which the wt % ratio of NaOH and KOH was fixed to 1:9, as illustrated in FIG. 6. For example, there is an advantage in that the metal impurities were improved by the pores formed by Na ions when cleaning activated carbon, as illustrated in FIG. 6. In this case, the metal impurities that remain after cleaning activated carbon may include Ni and K.

As described above, the specific surface area is increased, but the metal impurities are reduced depending on a ratio of carbide and mixed alkali. However, if an optimal ratio of carbide and mixed alkali is selected depending on the purpose of use of activated carbon, capacity per volume can be increased and the amount of the metal impurities that remain can be reduced.

At step S50 of simultaneously pressurizing the first active material sheet 20 and the second active material sheet 30 using the press unit 140, as illustrated in FIG. 8, first, when the first active material sheet 20, the second active material sheet 30, and the through type aluminum sheet 10 are transferred to a pair of first press rollers 141, the first active material sheet 20 and the second active material sheet 30 are primarily pressurized using the pair of first press rollers 141 with first pressure at the same time so that the first active material sheet 20 and the second active material sheet 30 are respectively placed on the first surface 10*a* and second surface 10*b* of the through type aluminum sheet 10 and bonded to the metal protection layer 130 at step S51.

When the through type aluminum sheet 10 onto which the first active material sheet 20 and the second active material sheet 30 have primarily pressurized is transferred to a pair of second press rollers 142, the first active material sheet 20 and the second active material sheet 30 that have been primarily pressurized are secondarily pressurized using the pair of second press rollers 142 with second pressure higher than the first pressure at the same time so that the first active material sheet 20 and the second active material sheet 30 are connected through the plurality of first hollow protrusion members 11 and the plurality of second hollow protrusion members 12 at step S52. In this case, the pressurization is performed so that the thicknesses T4 and T5 of the first active material sheet 20 and the second active material sheet 30 bonded to the first surface 10*a* and second surface 10*b* of the through type aluminum sheet 10 by the second pressure are 2 to 30% smaller than the thicknesses T6 and T7 (refer to FIG. 8) of the first active material sheet 20 and the second active material sheet 30 bonded to the first surface 10a and second surface 10b of the through type aluminum sheet 10 by the first pressure.

As illustrated in FIG. 8, the first pressure may be set by an interval M1, that is, a separation distance between the pair of first press rollers 141, and the second pressure may be set by an interval M2, that is, a separation distance between the pair of second press rollers 142. That is, the pair of first press rollers 141 is spaced apart from each other at the interval M1 so that the first pressure is applied to the first active material sheet 20 and the second active material sheet 30, the first active material sheet 20 is formed to a thickness T6, and the second active material sheet 30 is formed to a thickness T7. Furthermore, the pair of second press rollers 142 is spaced apart from each other at the interval M2 so that the second pressure is applied to the first active material sheet 20 and the second active material sheet 30, the first active material sheet 20 is formed to the thickness T4, and the second active material sheet 30 is formed to the thickness T5. Accordingly, the thicknesses T4 and T5 of the first active material sheet 20 and the second active material sheet 30 become 2 to 30% smaller than thicknesses T6 and T7. In this case, the thicknesses T6 and T7 are the same, and the thicknesses T4 and T5 are also the same.

The thicknesses T4 and T5 of the first active material sheet 20 and the second active material sheet 30 that have been secondarily pressurized so that they become 2 to 30% smaller than the thickness T6 and T7 of the first active material sheet 20 and the second active material sheet 30 that have been primarily pressurized are generated due to a difference M3+M4 between the interval M1 between the pair of first press rollers 141 and the interval M2 between the pair of second press rollers 142. That is, the first pressure and the second pressure are set by the interval M1 between the pair of first press rollers 141 of the press unit 140 and the interval M2 between the pair of second press rollers 142 of the press unit 140. A difference between the first pressure and the second pressure is generated due to the difference M3+M4 between the interval M1 between the pair of first press rollers 141 and the interval M2 between the pair of second press rollers 142. For example, if the interval M1 is set to be identical with an interval M2+M3+M4, the thicknesses T4 and T5 of the first active material sheet 20 and the second active material sheet 30 may become 2 to 30% smaller than the thicknesses T6 and T7, thereby being capable of easily implementing an electrode with a high voltage. In this case, the intervals M1 and M2 are respectively indicative of the interval between the pair of first press rollers 141 spaced apart from each other or the interval between the pair of second press rollers 142 spaced apart from each other.

Conductive adhesives are used in order to further improve adhesive strength between the metal protection layer 130 and the first active material sheet 20 and the second active material sheet 30. Known materials may be used as the conductive adhesives. After the conductive adhesives are coated on the metal protection layer 130 in the spray state so that the metal protection layer 130 is placed on the first surface 10a or second surface 10b of the through type aluminum sheet 10. Thereafter, the first active material sheet 20 and the second active material sheet 30 are pressurized by the press unit 140 so that the first active material sheet 20 and the second active material sheet 30 are more firmly bonded to the metal protection layer 130 through the conductive adhesives. Accordingly, the high-temperature long lifespan electrode for an electric double layer capacitor in accordance with an embodiment of the present invention can be fabricated.

As described above, the high-temperature long lifespan electrode for an electric double layer capacitor and the method of manufacturing the same according to the embodiments of the present invention can implement a high-temperature long lifespan electrode by preventing a loss of the surface area of an aluminum sheet that is used in an electrode for an electric double layer capacitor so that a contact area between the aluminum sheet and the active material sheet is increased when forming the plurality of through holes in the aluminum sheet and by forming the metal protection layer on the entire surface of the aluminum sheet.

The high-temperature long lifespan electrode for an electric double layer capacitor and the method of manufacturing the same according to the embodiments of the present invention may be applied to the manufacturing industry field for electric double layer capacitors.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A high-temperature long lifespan electrode for an electric double layer capacitor, comprising:
    a through type aluminum sheet configured to have a plurality of through holes formed in the through type aluminum sheet so that the through holes are spaced apart from one another;
    a plurality of first hollow protrusion members extended from the through type aluminum sheet in such a way as to communicate with the through holes and protruded to a first side of the through type aluminum sheet;
    a plurality of second hollow protrusion members spaced apart from the plurality of first hollow protrusion members, extended from the through type aluminum sheet in such a way as to communicate with the through holes, and protruded to a second side of the through type aluminum sheet;
    a metal protection layer coated on the through type aluminum sheet, the plurality of first hollow protrusion members, and the plurality of second hollow protrusion members;
    a first active material sheet placed on a first surface of the through type aluminum sheet and bonded to the metal protection layer so that the plurality of first hollow protrusion members is buried; and
    a second active material sheet placed on a second surface of the through type aluminum sheet and bonded to the metal protection layer so that so that the plurality of second hollow protrusion members is buried and the second active material sheet is connected to the first active material sheet through the plurality of first hollow protrusion members and the plurality of second hollow protrusion members,
    wherein each of the plurality of first hollow protrusion members and the plurality of second hollow protrusion members is formed by perforating the through type aluminum sheet by applying pressure on the first side or second side of the through type aluminum sheet using one of a cylindrical pillar member, an elliptical pillar member, and a square pillar member each having a pointed tip so that the plurality of through holes is formed in the through type aluminum sheet, the plurality of first hollow protrusion members and the plurality of second hollow protrusion members are extended and protruded from the through type aluminum sheet in such a way as to respectively communicate with the plurality of through holes, and each of the through holes has one of a cylindrical shape, an oval, and a square shape by one of the cylindrical pillar member, the elliptical pillar member, and the square pillar member.

2. The high-temperature long lifespan electrode of claim 1, wherein:

the plurality of through holes spaced apart from one another is formed in the through type aluminum sheet, the first surface and second surface of the through type aluminum sheet penetrate the plurality of through holes, and each of the plurality of through holes has a diameter of 50 to 100 μm.

3. The high-temperature long lifespan electrode of claim 1, wherein the through type aluminum sheet has a thickness of 10 to 50 μm.

4. The high-temperature long lifespan electrode of claim 1, wherein each of the plurality of first hollow protrusion members and the plurality of second hollow protrusion members comprises one or more extruded burr members formed by one of a cylindrical pillar member, an elliptical pillar member, and a square pillar member each having a pointed tip.

5. The high-temperature long lifespan electrode of claim 4, wherein:

the one or more extruded burr members are spaced apart from one another and integrally formed in the through type aluminum sheet so that the extruded burr members are extended from the through hole, and each of the one or more extruded burr members has a height of 2 to 70 μm.

6. The high-temperature long lifespan electrode of claim 1, wherein:

the first active material sheet and the second active material sheet are simultaneously pressurized, placed on the first surface and second side of the through type aluminum sheet, and bonded to the metal protection layer by repeating a roll press method twice or more so that the first active material sheet and the second active material sheet are connected through the plurality of first hollow protrusion members and the plurality of second hollow protrusion members, and if the roll press method is repeatedly performed twice or more, each of a thickness of the first active material sheet and a thickness of the second active material sheet pressurized by a roll press method that is finally performed is 2 to 30% smaller than each of a thickness of the first active material sheet and a thickness of the second active material sheet pressurized by a roll press method that is first performed.

7. The high-temperature long lifespan electrode of claim 1, wherein:

the first active material sheet and the second active material sheet are made of identical active materials, each of the first active material sheet and the second active material sheet has a thickness of 100 to 500 μm, the active materials comprise activated carbon, and the activated carbon has an average particle diameter of 1 to 10 μm and a specific surface area of 1200 to 2200 $m^2/g$.

8. The high-temperature long lifespan electrode of claim 1, wherein:

the metal protection layer is made of one of nickel (Ni), zinc (Zn), and tin (Sn) using electrolytic plating or made of NiWPd of a ternary alloy using electroless plating, and the metal protection layer has a thickness of 0.1 to 3 μm.

9. A method of manufacturing a high-temperature long lifespan electrode for an electric double layer capacitor, the method comprising:

preparing a through type aluminum sheet configured to have a plurality of first hollow protrusion members and a plurality of second hollow protrusion members respectively formed in a first surface and second surface of the through type aluminum sheet and to have a metal protection layer formed on an entire surface by winding the through type aluminum sheet on a first roller;

preparing a first active material sheet by winding the first active material sheet on a second roller;

preparing a second active material sheet by winding the second active material sheet on a third roller;

placing the first active material sheet on the first surface of the through type aluminum sheet and the second active material sheet on the second surface of the through type aluminum sheet and transferring the through type aluminum sheet and the first active material sheet and the second active material sheet to a press unit; and placing the first active material sheet and the second active material sheet on the first surface and second surface of the through type aluminum sheet, respectively, bonding the first active material sheet and the second active material sheet to the metal protection layer, and simultaneously pressurizing the first active material sheet and the second active material sheet using the press unit so that the first active material sheet and the second active material sheet are connected through the plurality of first hollow protrusion members and the plurality of second hollow protrusion members, wherein preparing the through type aluminum sheet comprises:

forming the plurality of first hollow protrusion members and the plurality of second hollow protrusion members on the first surface and second surface of the through type aluminum sheet, respectively;

forming the metal protection layer by performing electrolytic plating or electroless plating on the through type aluminum sheet in which the plurality of first hollow protrusion members and the plurality of second hollow protrusion members have been formed; and winding the through type aluminum sheet on the first roller after the metal protection layer is formed.

10. The method of claim 9, wherein preparing the through type aluminum sheet comprises:

forming a plurality of through holes in the through type aluminum sheet by perforating the through type aluminum sheet by applying pressure in the first surface or the second surface using one of a cylindrical pillar member, an elliptical pillar member, and a square pillar member each having a pointed tip, and integrally forming the plurality of first hollow protrusion members or the plurality of second hollow protrusion members so that the plurality of first hollow protrusion members or the plurality of second hollow protrusion members are extended and protruded from the through type aluminum sheet in such a way as to respectively communicate with the plurality of through holes.

11. The method of claim 10, wherein each of the plurality of first hollow protrusion members and the plurality of second hollow protrusion members is protruded to a first side or second side of the through type aluminum sheet.

12. The method of claim 9, wherein:
in preparing the through type aluminum sheet, the metal protection layer is made of one of nickel (Ni), zinc (Zn), and tin (Sn) using the electrolytic plating or made of NiWPd of a ternary alloy using the electroless plating;
the electroless plating comprises:
cleaning the through type aluminum sheet in which the first active material sheet and the second active material sheet have been formed using deionized water,
immersing the cleaned through type aluminum sheet in a mixed solution of $SnCl_2$ of 1 to 5 g/L and HCl of 1 to 5 ml at normal temperature for 1 to 5 minutes and performing sensitization processing,
immersing the through type aluminum sheet subjected to the sensitization processing in a mixed solution of $PdCl_2$ of 1 to 10 g/L and HCl of 1 to 10 ml at normal temperature for 1 to 10 minutes and performing activation processing, and
performing electroless plating processing the through type aluminum sheet subjected to the activation processing in a plating solution having PH of 7 to 9 and a temperature of 50 to 70° C. for 10 to 30 minutes, thus forming the metal protection layer made of NiWPd of a ternary alloy; and
the plating solution comprises $NiSO_4 \cdot 7H_2O$ of 1 to 7 g/L, $Na_2WO_4 \cdot 2H_2O$ of 28 to 35 g/L, a complex agent of 29 to 36 g/L, and a reducing agent of 18 to 25 g/L, the complex agent comprises $C_6H_{17}N_3O_7$, and the reducing agent comprises $NaH_2PO_2$.

13. The method of claim 9, wherein in preparing the first active material sheet and preparing the second active material sheet, the first active material sheet and the second active material sheet are made of identical active materials, and the active materials comprise an electrode substance of 60 to 80 wt % and a viscosity control substance of 20 to 40 wt % and have viscosity of 5000 to 10000 cps (centi Poise).

14. The method of claim 13, wherein:
the electrode substance comprises activated carbon of 85 to 95 wt %, a conductive agent of 3 to 8 wt %, and a binder of 2 to 7 wt %,
the activated carbon is fabricated by performing activation processing on carbon particle powder fabricated using an aqueous solution method,
the activation processing is performed by mixing the carbon particle powder and mixed alkali in a wt % ratio of 1:2 to 3, drying the mixture, and annealing the dried mixture in a tube furnace under a nitrogen atmosphere in a temperature of 600 to 1000° C., and
the mixed alkali is mixed so that a wt % ratio of NaOH and KOH is 1:9 to 12.

15. The method of claim 13, wherein the viscosity control substance comprises alcohol of 30 to 60 wt % and pure water of 40 to 70 wt %.

16. The method of claim 9, wherein simultaneously pressurizing the first active material sheet and the second active material sheet using the press unit comprises:
primarily pressurizing the first active material sheet and the second active material sheet with first pressure using a pair of first press rollers so that the first active material sheet and the second active material sheet are respectively placed on the first surface and second surface of the through type aluminum sheet and bonded to the metal protection layer; and
secondarily pressurizing the first active material sheet and the second active material sheet simultaneously with second pressure higher than the first pressure using a pair of second press rollers so that the primarily pressurized first active material sheet and second active material sheet are connected through the plurality of first hollow protrusion members and the plurality of second hollow protrusion members,
wherein the first pressure is set by an interval between the pair of first press rollers, and the second pressure is set by an interval between the pair of second press rollers.

17. The method of claim 16, wherein in secondarily pressurizing the first active material sheet and the second active material sheet, the second pressure is applied so that thicknesses of the first active material sheet and the second active material sheet bonded to the first surface and second surface of the through type aluminum sheet are 2 to 30% smaller than thicknesses of the first active material sheet and the second active material sheet bonded to the first surface and second surface of the through type aluminum sheet by the first pressure.

* * * * *